US008079144B2

(12) United States Patent
Holden

(10) Patent No.: US 8,079,144 B2
(45) Date of Patent: Dec. 20, 2011

(54) METHOD OF MANUFACTURE, REMANUFACTURE, OR REPAIR OF A COMPRESSOR

(75) Inventor: Steven J. Holden, Manlius, NY (US)

(73) Assignee: Carrier Corporation, Farmington, CT (US)

( * ) Notice: Subject to any disclaimer, the term of this patent is extended or adjusted under 35 U.S.C. 154(b) by 1011 days.

(21) Appl. No.: 12/013,992

(22) Filed: Jan. 14, 2008

(65) Prior Publication Data

US 2008/0163473 A1 Jul. 10, 2008

Related U.S. Application Data

(60) Continuation-in-part of application No. 10/828,404, filed on Apr. 19, 2004, now Pat. No. 7,318,275, which is a division of application No. 10/331,793, filed on Dec. 30, 2002, now Pat. No. 6,739,851.

(51) Int. Cl.
*B23P 6/00* (2006.01)

(52) U.S. Cl. .................... 29/888.021; 29/458; 29/527.2; 418/178

(58) Field of Classification Search ............. 29/888.021, 29/888.022, 888.023, 888.024, 888.025, 29/458, 527.2; 418/178, 201.1, 197
See application file for complete search history.

(56) References Cited

U.S. PATENT DOCUMENTS

| | | | |
|---|---|---|---|
| 3,282,495 | A | 11/1966 | Walls |
| 3,465,683 | A | 9/1969 | Blomgren |
| 3,632,240 | A | 1/1972 | Dworak |
| 4,225,295 | A | 9/1980 | Shimizu et al. |
| 4,466,785 | A | 8/1984 | Biswas |
| 4,549,862 | A | 10/1985 | Stich et al. |
| 4,717,322 | A | 1/1988 | Masuda et al. |
| 5,554,020 | A | 9/1996 | Rao et al. |
| 6,485,279 | B2 | 11/2002 | Zhong et al. |
| 6,506,037 | B1 | 1/2003 | Bush et al. |
| 6,506,038 | B2 | 1/2003 | Sjoholm et al. |
| 6,783,338 | B2 | 8/2004 | Moroi et al. |

FOREIGN PATENT DOCUMENTS

| | | |
|---|---|---|
| GB | 648055 | 11/1948 |
| JP | 58048792 | 3/1983 |
| JP | 05001685 | 1/1993 |
| JP | 06280764 | 10/1994 |

*Primary Examiner* — Jermie Cozart
(74) *Attorney, Agent, or Firm* — Bachman & LaPointe, P.C.

(57) ABSTRACT

A compressor has a housing assembly and at least one rotor held by the housing assembly for rotation about a rotor axis. The rotor has a first face and a first housing element has a second face in facing spaced-apart relation to the first face of the rotor. One or more spacer elements are positioned from the first housing element. The spacer elements are machined. A coating is applied over the first surface around the one or more spacer elements.

20 Claims, 6 Drawing Sheets

METHOD OF MANUFACTURE, REMANUFACTURE, OR REPAIR OF A COMPRESSOR

CROSS-REFERENCE TO RELATED APPLICATIONS

This application is a divisional and continuation-in-part of Ser. No. 10/828,404, now U.S. Pat. No. 7,318,275, filed Apr. 19, 2004, and entitled "Method of Remanufacturing a Compressor" which is a divisional of Ser. No. 10/331,793, now U.S. Pat. No. 6,739,851, filed Dec. 30, 2002, and entitled "Coated End Wall and Method of Manufacture", the disclosures of which are incorporated by reference in their entireties herein as if set forth at length.

BACKGROUND OF THE INVENTION

This invention relates to compressors, and more particularly to screw compressors.

Screw-type compressors are commonly used in refrigeration applications. In such a compressor, intermeshed male and female lobed rotors or screws are driven about their axes to pump the refrigerant from a low pressure inlet end to a high pressure outlet or discharge end. The rotors are typically supported by bearings on inlet and outlet sides of their lobed working portions.

The clearance between the discharge end faces of the rotors and the adjacent housing surface influences compressor efficiency. A tight or small clearance improves efficiency by reducing internal leakage. Maintaining a tight clearance may require precision machining and alignment of these surfaces. A tight clearance, however, risks metal-to-metal contact between the surfaces which may cause damage. Accordingly, for controlling leakage while maintaining metal-to-metal clearance, it is known to utilize a relatively soft coating on the housing surface to partially fill the metal-to-metal clearance. Should a rotor contact the coating, the coating will be conformed and/or abraded without substantial damage to metal components or performance. Various plastically conformable coatings are known, including, iron phosphate, magnesium phosphate, nickel polymer amalgams, nickel zinc alloys, aluminum silicon alloys with polyester, and aluminum silicon alloys with polymethylmethacrylate (PMMA). These may be applied by appropriate methods, including, for example, thermal spraying, physical vapor deposition (PVD), chemical vapor deposition (CVD), and aqueous deposition.

In an exemplary method of manufacture of such a compressor, the discharge end housing surface (e.g., of an outlet casing element of the housing assembly) is precision machined. The coating is then applied and the coating is machined to a desired final thickness. In this example, the precise thickness is required to provide precision in a subsequent end clearance setting process. In that process, the rotors are assembled and placed in a rotor housing portion of the housing assembly. The outlet casing is installed as are the bearings on the discharge end of the rotor shafts. Shims are inserted to cooperate with the thrust and radial bearings to constrain the longitudinal movement of the rotors relative to the outlet casing. The rotors are pulled against the outlet casing to zero a measurement tool. The rotors are then pushed away until restrained by their respective thrust bearings. The displacement is measured and this determines the clearance upon final assembly. If each measured clearance is within specified limits, the compressor may be further assembled. If not, for any rotor outside the limits, a different shim combination may be selected to bring the measured clearance more in line with the specified clearance and the process repeated.

BRIEF SUMMARY OF THE INVENTION

A compressor has a housing assembly and at least one rotor held by the housing assembly for rotation about a rotor axis. The rotor has a first face and a first housing element has a second face in facing spaced-apart relation to the first face of the rotor. The housing has a coating on the second face and a plurality of inserts protruding from the second face into the coating.

Advantageously, the housing is made of a first material and the inserts consist essentially of a material that is more malleable than the first material.

Another aspect of the invention involves a method of manufacture, remanufacture, or repair of a compressor. The compressor has a rotor with a working portion having a first end face. A housing assembly carries the rotor for rotation about a rotor axis. The housing assembly has a first housing element having a first surface facing the first end face. The method includes positioning one or more spacer elements from the first housing element. The one or more spacer elements are machined. A coating is applied over the first surface around the one or more spacer elements.

In various implementations, there may be a plurality of such spacer elements (e.g., between three and five). The machining may provide coplanarity of first end surfaces of the spacer elements. The coating may be plastically deformed to a thickness associated with a height of the spacer elements (e.g., above the housing first surface). The thickness may be between 40 and 250 μm. The plastic deformation may consist essentially of compressing (e.g., with the rotor or with a flat element). The positioning may comprise press fitting. Old spacer elements may be removed before inserting the spacer elements. The rotor may be a screw-type male rotor and the compressor may further include at least one screw-type female rotor and meshed with the male rotor.

Another aspect of the invention involves a method of manufacture, remanufacture, or repair wherein a coating is applied over a housing first surface around a number of spacers protruding from the housing. The coating is plastically deformed by compressing.

Another aspect of the invention involves a method of manufacture, remanufacture, or repair including one or more steps for providing at least one spacer element protruding from a housing first element. A coating is applied in one or steps over a first surface of the first housing element. The applied coating is precompressed in one or more steps.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
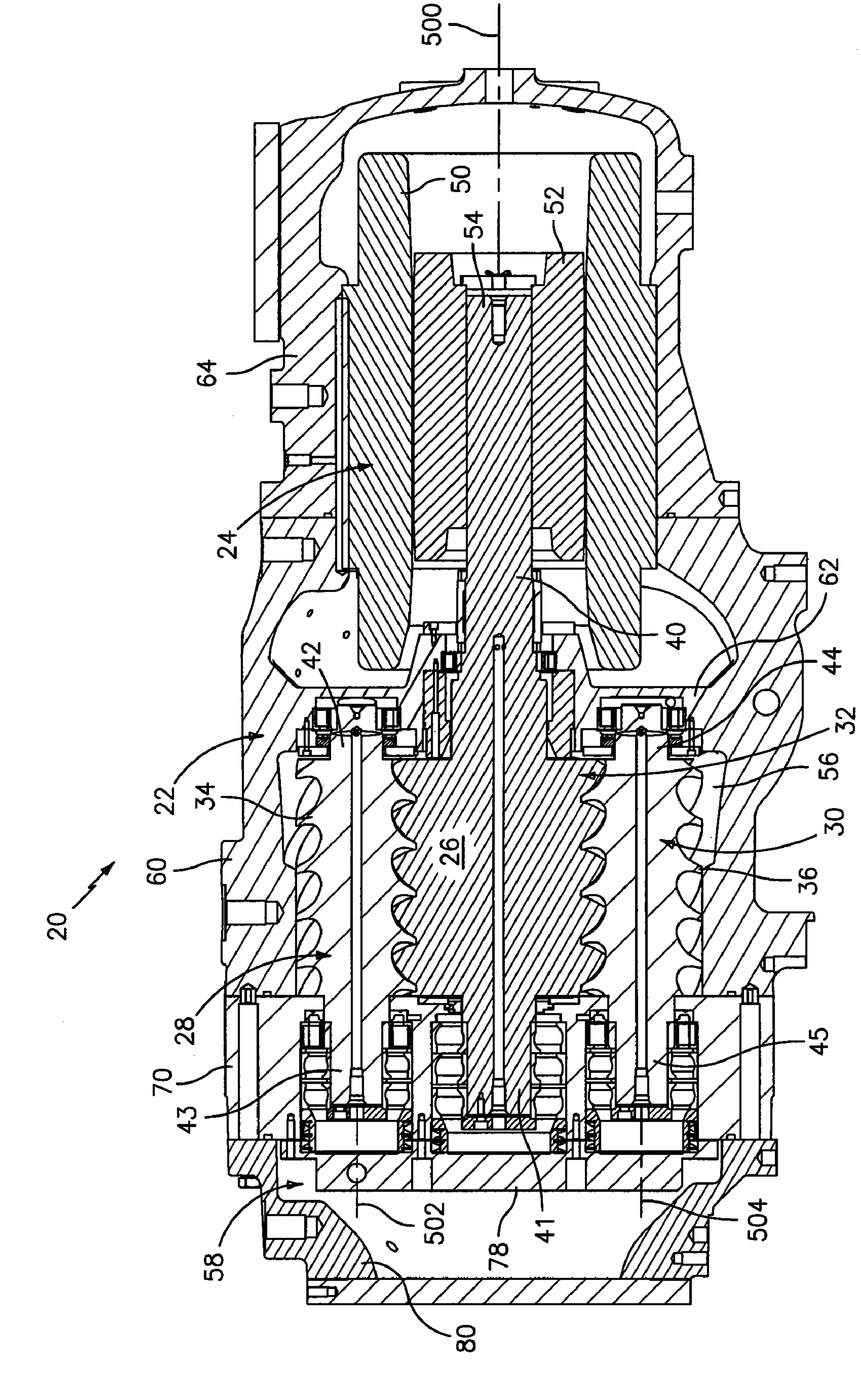
FIG. 1 is a partially schematic longitudinal sectional view of a compressor.

The invention relates to compressors and methods for manufacture, remanufacture and/or repair. Spacer elements are associated with the application of a coating to one or more select surfaces of the compressor to improve such manufacture, remanufacture and/or repair. FIG. 1 shows a compressor 20 having a housing assembly 22 containing a motor 24 driving three rotors 26, 28, and 30 having respective central longitudinal axes 500, 502, and 504. In the exemplary embodiment, the rotor 26 is centrally positioned within the compressor and has a male lobed body or working portion 32 enmeshed with female lobed bodies or working portions 34 and 36 of the female rotors 28 and 30. Each rotor includes shaft portions (e.g., stubs 40, 41; 42, 43; and 44, 45 (FIG. 2) unitarily formed with the associated working portion 32; 34; and 36) extending from first and second ends of the working portion. Each of these shaft stubs is mounted to the housing by one or more bearing assemblies for rotation about the associated rotor axis.

In the exemplary embodiment, the motor is an electric motor having a rotor 50 and a stator 52. A distal portion 54 of the first shaft stub 40 of the male rotor 26 extends within the stator 52 and is secured thereto so as to permit the motor 24 to drive the male rotor 26 about the axis 500. When so driven in an operative first direction about the axis 500, the male rotor drives the female rotors in opposite directions about their axes 502 and 504. The resulting enmeshed rotation of the rotor working portions tends to drive fluid from a first (inlet) end plenum 56 to a second (outlet/discharge) end plenum 58 while compressing such fluid. This flow defines downstream and upstream directions. The exemplary housing assembly 22 includes a rotor housing 60 having a transverse web 62 in which the rotor inlet end shaft stubs are mounted via appropriate bearings, seals and the like. The rotor housing 60 extends upstream from the web to substantially contain and surround the rotor working portions. The rotor housing 60 extends upstream to mate with a motor casing 64 which cooperates with the rotor housing to support and contain the motor 24. At its downstream end, the rotor housing 60 mates with an outlet casing 70. For each of the rotors, the outlet casing has a bearing compartment carrying a series of bearing assemblies (described below) for rotatably mounting the downstream (outlet/discharge end) shaft stub of such rotor. The outlet casing further includes an upstream-facing end surface 72 (FIG. 2) in close facing proximity to the discharge end faces (surfaces) of the rotor working portions. A bearing cover plate 78 is centrally mounted to the outlet casing to cover the bearing compartments. A discharge housing 80 (FIG. 1) is mounted surrounding the bearing cover plate. Exemplary rotor and housing materials are metals. Exemplary housing components are made of gray iron. Exemplary rotors are made of ductile iron and/or steel.

Figure 2:
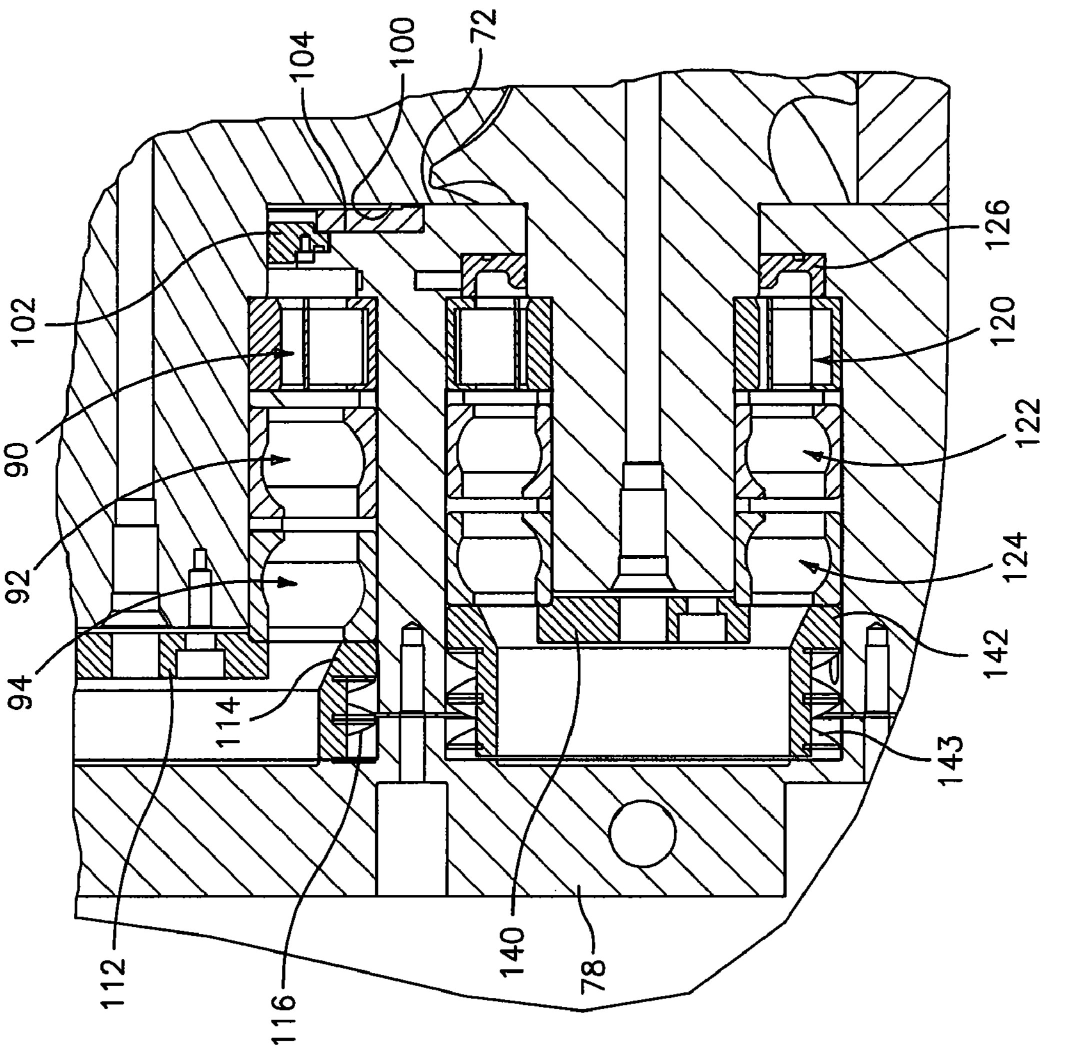
FIG. 2 is an enlarged view of a portion of the compressor of FIG. 1.

FIG. 2 shows further details of the mounting of the outlet end shaft stubs of the male and female rotors. Aligned in an inlet-to-outlet direction, the male rotor has a radial bearing 90, a thrust bearing 92, and a counterthrust bearing 94. Along the shaft stub between the bearing 90 and the discharge end face 100 of the rotor working portion, a floating bushing seal 102 is carried by the outlet casing to engage the shaft and an axial seal 104 is carried by the outlet casing to engage the face 100. The clearance between the surface 72 and the face 100 is determined by the cooperation of the bearings 90, 92, and 94 along with any spaces and/or shims. A rotor cap 112, secured to the end of the shaft stub, bears against the outlet end rim of the inner race of the third bearing 94 to capture the sandwich of the three inner races. A bearing retainer 114 has an inlet end rim engaging a preload spring 116 which in turn engages the outer race of the third bearing 94 and an outlet end rim engaging the bearing cover plate 78.

The outlet end shaft stub of each female rotor has, aligned in an inlet-to-outlet direction a radial bearing 120, a thrust bearing 122, and a counterthrust bearing 124. A floating bushing seal 126 engages the shaft in a reduced diameter base portion of the bearing compartment. At its inlet end rim, the inner race of the bearing 120 contacts a shoulder of the shaft stub. A rotor cap 140, secured to the end of the shaft stub, bears against the outlet end rim of the inner race of the bearing 124 to capture the sandwich of three inner races. A bearing retainer 142 has an inlet end rim engaging the outer race of the bearing 124 and an outlet end rim engaging a preload spring 143 which in turn engages the bearing cover plate.

Figure 3:
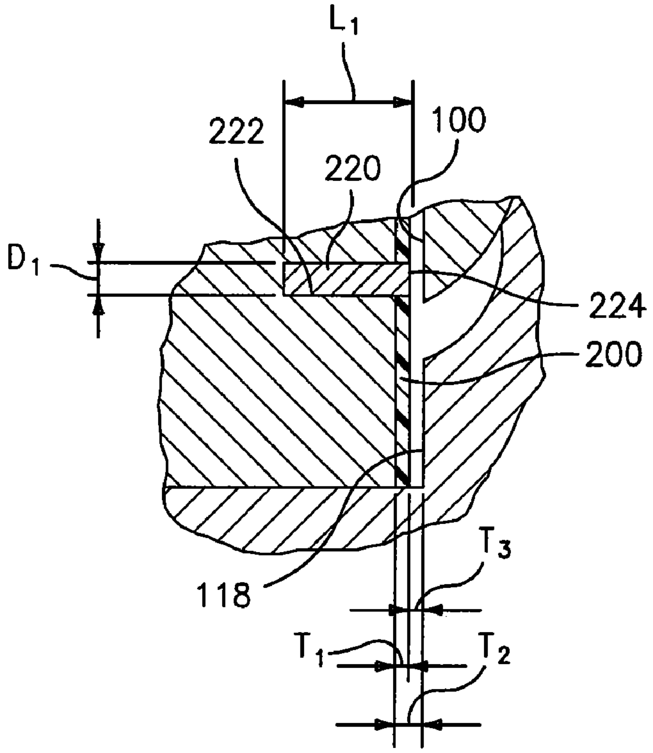
FIG. 3 is an enlarged view of a portion of the compressor of FIG. 2.

FIG. 3 further shows, in exaggerated thickness, a coating 200 on the surface 72 and a plurality of pins 220 mounted in bores 222 in the outlet casing and protruding from the surface 72 to extend into the coating. In the illustrated exemplary embodiment, four of the pins lie along the common plane of the rotor axes, whereas others are similarly oriented but lie away from the plane. Of these four pins, each of the outboard pins is associated with one of the female rotors and is positioned with its inlet end face 224 in close facing proximity to an area swept by the portion of the outlet end surface 118 that lies along the female rotor lobes. Each of the inboard pins is similarly positioned relative to one of the female rotors but is also positioned in an area swept by the end surface 100 of the male rotor along its lobes as shown in further detail in FIG. 3.

FIG. 3 further identifies a pin length $L_1$, a pin diameter $D_1$, a coating thickness $T_1$, an overall metal-to-metal clearance $T_2$, and a metal-to-coating clearance $T_3$.

Figure 4:
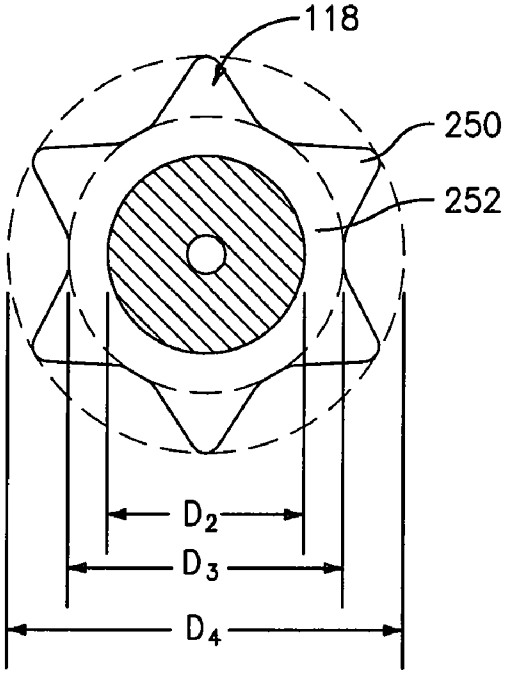
FIG. 4 is an end view of a female rotor working portion.

FIG. 4 shows an exemplary outlet end surface (face) 118 of a female rotor. The face includes portions 250 defined by the ends of the plurality of lobes and a central continuous annular portion 252 inboard of the lobe roots. In the illustrated embodiment, at the outlet end surface, the shaft stub has a diameter $D_2$, the central portion 252 has a root diameter $D_3$ and the lobes have an outside diameter $D_4$.

In an alternate pin arrangement each pin associated with the female rotor is positioned to fall entirely under the root diameter $D_3$. This permits a minimal number of pins as it guarantees pins will be aligned with the end surface regardless of rotor orientation. Although as few as one pin may be used, three are advantageous for purposes of precise orientation during the clearance setting process. If the pins were entirely positioned to fall between the root diameter $D_3$ and outside diameter $D_4$, then, if it is desired that contact be assured irrespective of orientation during the clearance setting procedure, either particularly broad pins would have to be used (e.g., pins with large $D_1$ or having sections like an annular segment) or a greater number of pins would have to be used.

In an exemplary method of manufacture, the pins are installed and their ends machined to provide the desired exposure (e.g., to $T_1$) in the same manufacturing station wherein the surface 72 is machined. The coating is then applied to a thickness of at least $T_1$. A flat or other plate may then be pressed down atop the coating until stopped by engagement with the pin end face 224. The compression advantageously plastically deforms the coating so that, when the plate and compressive forces are removed, the coating will retain a uniform thickness of $T_1$ coincident with or just slightly greater than the pin exposure. Alternatively, the rotor end faces could be used to plastically deform the coating by pulling the rotors into the coating until stopped by engagement with the pin end faces 224. This method may be less advantageous as the interlobe area would leave portions of the coating uncompressed unless the rotors were rotated and the process repeated.

Exemplary material for the pins is brass. Other materials, such as aluminum, bronze, or engineering plastics may alternatively be used. As described below, the pin material is advantageously softer and more malleable or otherwise deformable than that of the rotor so that, upon any rotor-to-pin contact the rotor will remain essentially undamaged, potentially sacrificing the pins.

Advantageously the coating is of a conformable coating material as are known in the art (e.g., as described above) or may yet be developed. As applied, the coating may have an exemplary thickness between 30 and 500 μm. After initial compression, the exemplary thickness $T_1$ may well be between 20 and 300 μm. More preferably, such thickness may be between 40 and 250 μm. The exemplary metal-to-coating clearance $T_2$ may well be between 5 and 100 μm, more preferably such clearance $T_2$ may be between 10 and 20 μm, leaving a preferred metal-to-metal clearance $T_3$ between 50 and 270 μm. Exemplary coating processes are described above. Among alternate coating processes are application of pre-formed coating layers (e.g., a peel & stick product with pressure-sensitive adhesive).

Figure 5:
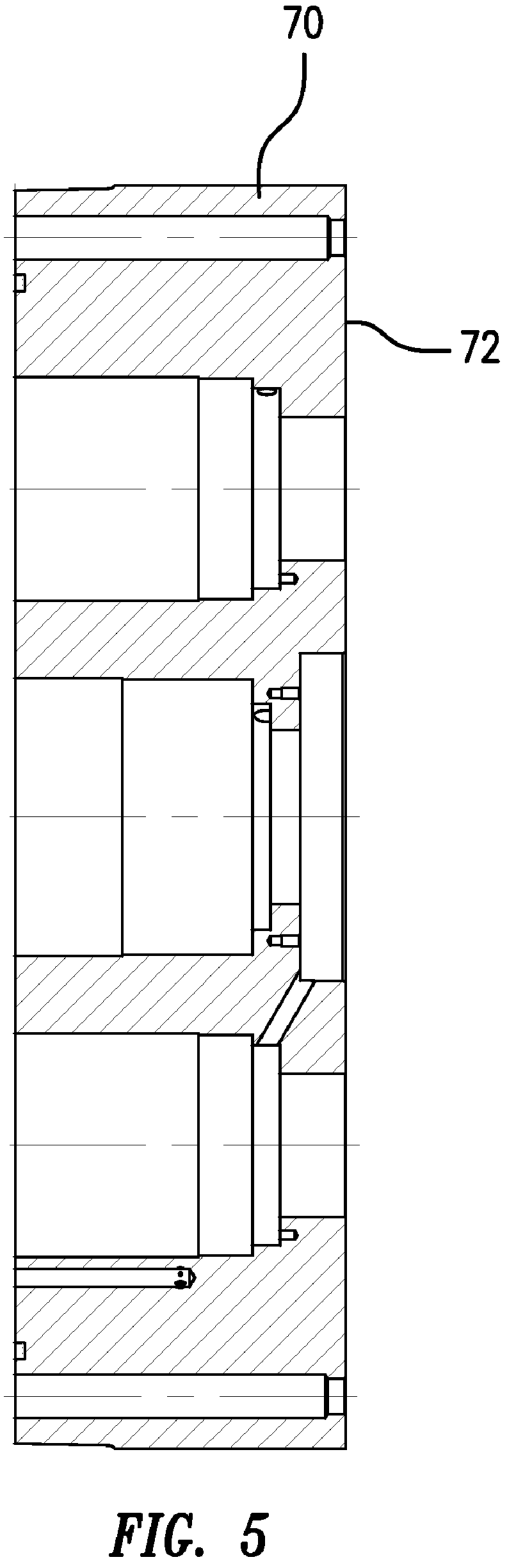
FIG. 5 is a longitudinal sectional view of an outlet casting.
Figure 6:
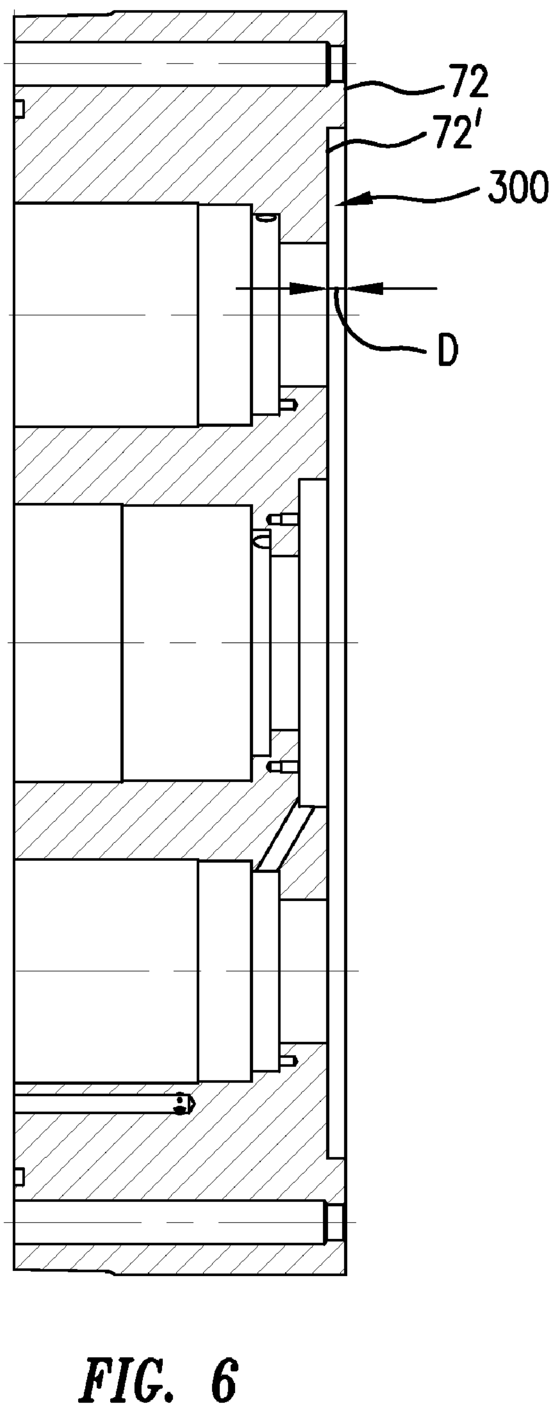
FIG. 6 is a view of the casting of FIG. 5 after a recess machining.
Figure 7:
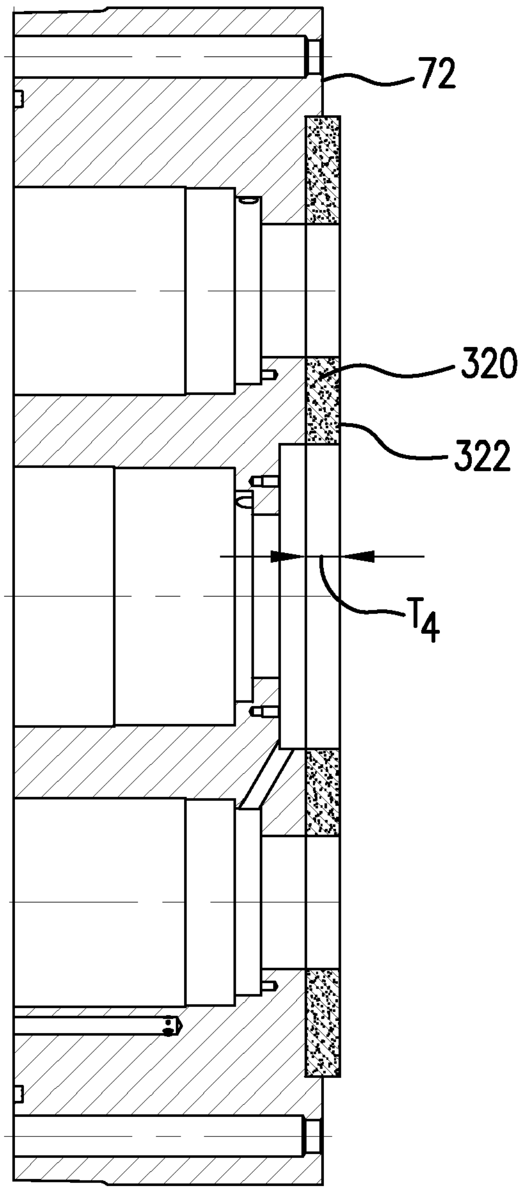
FIG. 7 is a view of the casting of FIG. 6 after a coating.

FIGS. 5-9 show an example of an alternate implementation as a retrofit/modification of an existing compressor. Specifically, FIG. 5 shows an existing/baseline outlet casting 70. For example, the casting 70 may be removed from a compressor in service. Alternatively, the casting may be new (even including in an intermediate stage of manufacture). The exemplary outlet casting 70 is shown with pre-formed bearing compartments, mounting bores, and porting. The casting 70 may be fixtured and a recess/trough 300 (FIG. 6) machined (e.g., with an end mill or other tool) in the initial end surface 72. The machining leaves the trough having a base surface portion 72' recessed below the intact surface 72 by a depth D. In a subsequent stage, a coating 320 (FIG. 7) is applied in the recess/trough 300 to an initial thickness $T_4$, leaving the exposed surface 322 of the coating proud of the surface 72. Prior to application of the coating 320, various features may be masked (e.g., the bearing compartments, ports, and intact portion of the surface 72 surrounding the recess).

Figure 8:
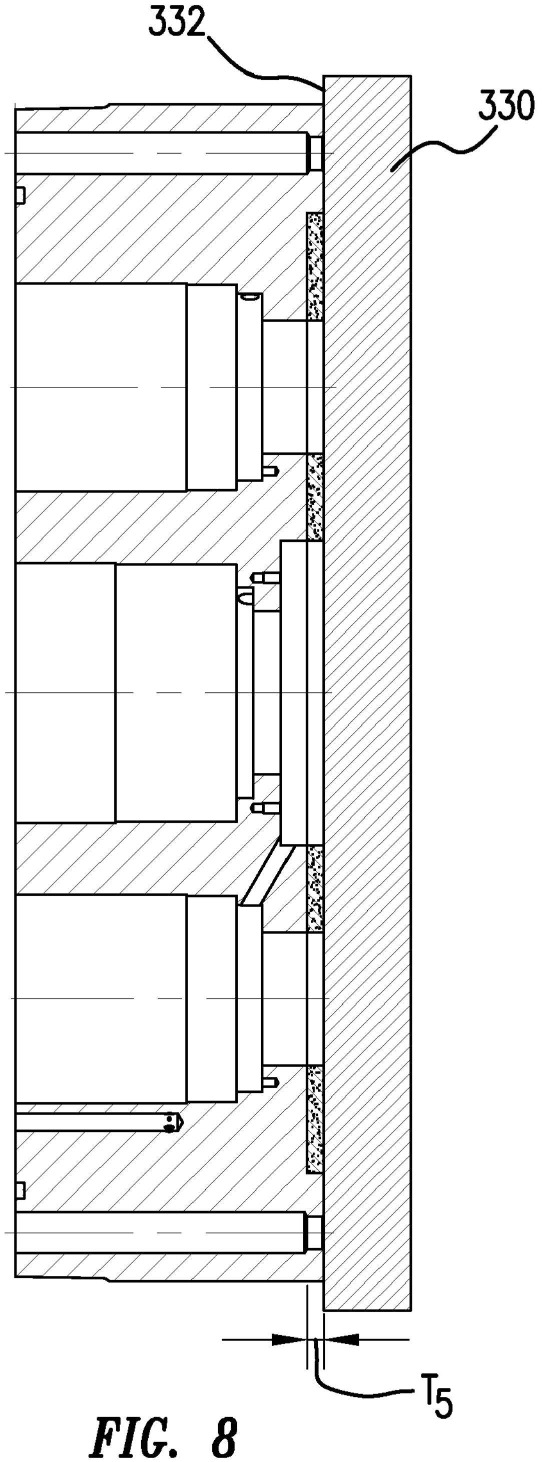
FIG. 8 is a view of the casting of FIG. 7 after deformation of the coating.

After coating application, the coating 320 may be compressed. FIG. 8 shows a flat plate 330 compressing the coating so that the surface 322 becomes flush with the intact surface 72. A portion of the plate 330 laterally beyond the coating may register with the intact surface 72 to ensure precise deformed coating thickness. In alternative implementations, there may be slight undercompression or overcompression. For example, an undercompression may involve recessing a portion of the surface 332 of the plate 330 coextensive with the coating 320. An overcompression may involve having that surface portion proud of the portion engaging the surface 72. The compression may be to a final thickness $T_5$ which may be coincident with the depth D and similar to the thickness $T_1$ identified above.

Figure 9:
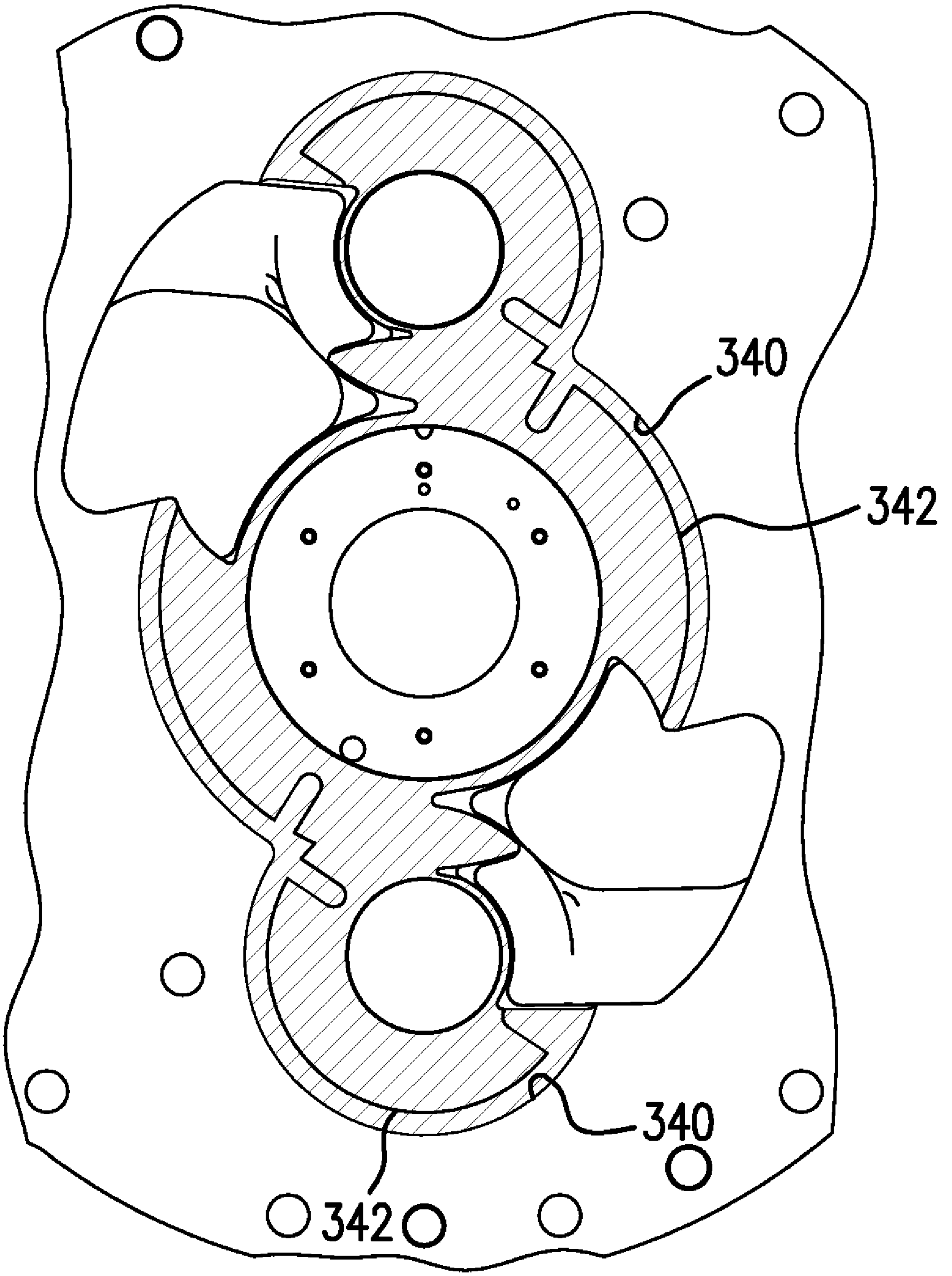
FIG. 9 is an end view of the casting of FIG. 8.

FIG. 9 shows a lateral perimeter 340 of the recess/trough 300. FIG. 9 also shows a perimeter 342 of a baseline coated area of the baseline casting 70. Hatching shows coating extent rather than sectioning. Whereas much of the perimeter 342 falls along the rotor bores (boundary of rotor lobe sweep), the adjacent perimeter 340 falls slightly therebeyond.

One or more embodiments of the present invention have been described. Nevertheless, it will be understood that various modifications may be made without departing from the spirit and scope of the invention. For example, it might be applied to various compressors including open-drive compressors, single-rotor screw compressors, or other multi-rotor screw compressors. Accordingly, other embodiments are within the scope of the following claims.

What is claimed is:

1. A method of manufacture, remanufacture, or repair of a compressor having:

a rotor having a working portion having a first end face;

a housing assembly carrying the rotor for rotation about a rotor axis and having a first housing element having a first surface facing the first end face rotor working portion, the method comprising:

applying a coating over the first surface; and plastically deforming the coating by compressing the coating.

2. The method of claim 1 wherein:

the coating is applied around a plurality of spacers elements protruding from the first housing element.

3. The method of claim 1 wherein:

the compressing comprises compressing with the rotor.

4. The method of claim 1 wherein:

the compressing comprises compressing with a flat plate.

5. The method of claim 1 further comprising:

machining a recess along the first surface.

6. The method of claim 5 wherein:

the machining of the recess machines the recess extending radially beyond swept areas of the rotor working portion.

7. The method of claim 5 wherein:

the machining of the recess machines the recess extending radially beyond rotor bores of the housing.

8. The method of claim 5 wherein:

the compressing comprises compressing with a flat plate.

9. The method of claim 1 wherein:

said rotor is a screw-type male rotor and the compressor further includes at least one screw-type female rotor enmeshed with the male rotor.

10. The method of claim 1 wherein:

the plastically deforming consists essentially of compressing with a flat element.

11. The method of claim 1 wherein:

the compressing compresses the coating to a thickness between 40 and 250 μm.

12. The method of claim 1 being a method of remanufacture wherein the first housing element is removed prior to the applying of the coating.

13. A method of manufacture, remanufacture, or repair of a compressor having:

a rotor having a working portion having a first end face;

a housing assembly carrying the rotor for rotation about a rotor axis and having a first housing element having a first surface facing the first end face rotor working portion, the method comprising the steps of:

one or more steps for applying a coating over the first surface; and one or more steps for precompressing the coating after the one or more steps for applying.

14. The method of claim 13 further comprising:

one or more steps for forming a recess along the first surface to receive the coating.

15. The method of claim 14 wherein:

the one or more steps for precompressing comprises compressing with a single plate.

16. The method of claim 13 further comprising:

one or more steps for providing at least one spacer element protruding from the first housing element.

17. The method of claim 16 wherein:

the one or more steps for providing at least one spacer element protruding from the first housing element includes an inserting step and a machining step after the inserting step.

18. The method of claim 17 wherein:

the one or more steps for applying a coating over the first surface comprises applying the coating around the at least one spacer element.

19. The method of claim 16 wherein:

the one or more steps for applying a coating over the first surface comprises applying the coating around the at least one spacer element.

20. The method of claim 13 wherein:

the one or more steps for precompressing comprises compressing with a single plate.

* * * * *